(12) United States Patent
Chini et al.

(10) Patent No.: US 10,091,053 B2
(45) Date of Patent: Oct. 2, 2018

(54) COMPREHENSIVE HIGH RESOLUTION CABLE DIAGNOSTICS FOR IN-VEHICLE ETHERNET PHYS

(71) Applicant: Avago Technologies General IP (Singapore) Pte. Ltd., Singapore (SG)

(72) Inventors: Ahmad Chini, Mission Viejo, CA (US); Bruce H. Conway, Aliso Viejo, CA (US); Mehmet V. Tazebay, Irvine, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 83 days.

(21) Appl. No.: 15/040,506

(22) Filed: Feb. 10, 2016

(65) Prior Publication Data
US 2017/0134215 A1    May 11, 2017

Related U.S. Application Data
(60) Provisional application No. 62/252,186, filed on Nov. 6, 2015.

(51) Int. Cl.
*H04L 12/24* (2006.01)
*H04L 12/26* (2006.01)

(52) U.S. Cl.
CPC .......... *H04L 41/0631* (2013.01); *H04L 43/10* (2013.01); *H04L 43/50* (2013.01)

(58) Field of Classification Search
CPC combination set(s) only.
See application file for complete search history.

(56) References Cited

U.S. PATENT DOCUMENTS

| | | | |
|---|---|---|---|
| 6,304,598 B1* | 10/2001 | Agazzi | H04B 3/32 375/232 |
| 2006/0007992 A1* | 1/2006 | Wang | H04B 3/46 375/224 |
| 2008/0155326 A1* | 6/2008 | Agazzi | H04L 41/0681 714/26 |
| 2010/0260201 A1* | 10/2010 | Yu | H04L 25/4923 370/465 |

\* cited by examiner

*Primary Examiner* — Yee Lam
(74) *Attorney, Agent, or Firm* — Sterne, Kessler, Goldstein & Fox P.L.L.C.

(57) ABSTRACT

The present disclosure provides an apparatus and method for measuring echo responses of communication links used in in-vehicle networks with high resolution and high dynamic range, allowing for diagnostics of various failures and/or degradations with high precision. Additional information can be provided to indicate signaling quality, insertion loss, and return loss of the communication links used in in-vehicle networks. Together, these measures and information can provide a comprehensive diagnostic capability that improves network reliability and safety of in-vehicle networks.

20 Claims, 5 Drawing Sheets

COMPREHENSIVE HIGH RESOLUTION CABLE DIAGNOSTICS FOR IN-VEHICLE ETHERNET PHYS

CROSS REFERENCE TO RELATED APPLICATIONS

This application claims the benefit of U.S. Provisional Application No. 62/252,186, filed Nov. 6, 2015, which is incorporated herein by reference in its entirety.

TECHNICAL FIELD

This application relates generally to in-vehicle networks, including Ethernet based in-vehicle networks.

BACKGROUND

The electronics in an automobile are typically divided into different domains, such as the power train domain, the chassis domain, the body/comfort domain, the driver assistance domain, and the human-machine interface (HMI) domain. Traditionally, each of these domains contained a set of control units and sensors that operated independently from the control units and sensors of the other domains. Today, there is a lot more interaction between the domains in support of new, advanced features, such as lane-departure warning and collision avoidance. On top of the increased inter-domain interaction, these new, advanced features have further led to an increase in the number of control units and sensors within each domain and the sophistication of these units in terms of the amount of data they process and the speed at which they operate.

The in-vehicle network infrastructure, used to support communications within and between these domains, has suffered as a result of the increased electronic complexity. The amount of cabling alone used by conventional in-vehicle network infrastructures has caused the car cable assembly to become not only one of the highest cost components in the car (often behind only the engine and chassis), but also one of the heaviest, which negatively effects fuel economy. Also, to support different latency and bandwidth requirements of the various control systems and sensors, the conventional in-vehicle network infrastructure has evolved into a heterogeneous network of various communications networks and protocols, such as the Local Interconnect Network (LIN), FlexRay, Controller Area Network (CAN), Low-Voltage Differential Signaling (LVDS), and the Media Oriented Systems Transport (MOST) protocol. This network heterogeneity complicates communications between domains by requiring gateways to effectuate such exchanges.

Figure 1:
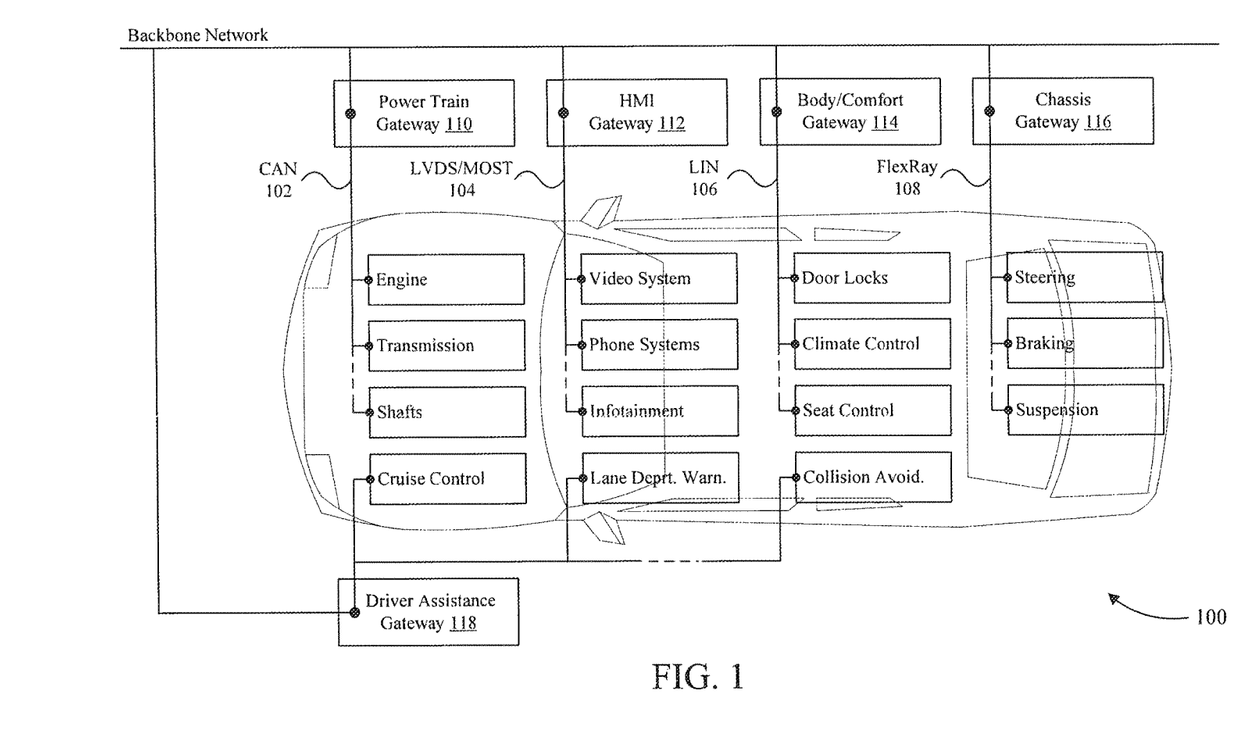
FIG. 1 illustrates an example of a conventional in-vehicle network.

To provide further context, FIG. 1 illustrates an example overview of a conventional in-vehicle network 100. As shown in FIG. 1, conventional in-vehicle network 100 is divided among several different domains, including a power train domain, an HMI domain, a body/comfort domain, a chassis domain, and a driver assistance domain. The power train domain includes electronic controllers and sensors that are active in the forward and backward movement of the vehicle, including electronic controllers and sensors associated with the operation of the engine, transmission, and shafts. The chassis domain includes electronic controllers and sensors that relate to the framework of the automobile and the movement/position of the wheels. For example, the chassis domain can include electronic controllers and sensors that support steering, braking, and suspension. The body/comfort domain includes electronic controllers and sensors for such things as door locks, climate control, and seat control. The HMI domain includes electronics that provide for information exchange between the automobile's electronics and the driver/passengers. For example, the HMI domain includes video systems, phone systems, and infotainment systems. Finally, the driver assistance domain includes electronic controllers and sensors that aid the driver in driving the automobile. The electronic controllers and sensors in the driver assistance domain relate to such systems as cruise control, lane departure warning, and collision avoidance.

As mentioned above, because of the different requirements of each domain, such as latency and bandwidth requirements, the domains often use different communication protocols. For example, as shown in FIG. 1, the power train domain uses a CAN based network 102, the HMI domain uses a LVDS/MOST based network 104, the body/comfort domain uses a LIN based network 106, and the chassis domain uses a FlexRay based network 108. This network heterogeneity requires each domain to have a separate gateway 110-118, as further shown in FIG. 1, to allow for communications between the domains over a backbone network.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Ethernet Based In-Vehicle Network

Because of the issues with conventional in-vehicle networks discussed above, a new approach to in-vehicle networks that reduces cost, complexity, and/or weight is desired. A homogenous, switched Ethernet based in-vehicle network could be used to this end. But conventional switched Ethernet networks are generally costly for automotive applications and do not meet automotive electromagnetic interference (EMI) requirements while the car is moving. For example, at the data speeds of common Ethernet PHYs, such as 100BASE-TX PHYs and 1000BASE-TX PHYs, the signal edges produced by these devices are fast enough to result in too much radiated energy to meet automotive EMI requirements. Shielded cables can be used to reduce EMI, but at increased cost and weight.

Certain embodiments of the present disclosure may be found in a local PHY in an automobile that converts standard Ethernet media independent interface (MII) data from a 4-bit packet stream, for example, to a 3-bit packet stream (where 4-bits and 3-bits are only exemplary values and can be different values as would be appreciated by one of ordinary skill in the art based on the teachings herein). The 3-bit packet stream may be mapped to first and second ternary bits streams for communication to a remote PHY in the automobile utilizing PAM-3 over an unshielded twisted-pair cable. The local PHY can multiplex the ternary bits streams into a single stream for transmission over the unshielded twisted-pair cable. In other words, the data flow of the Ethernet line code may begin from a 4-bit MII data stream and then undergo reformation into a 3-bit binary data stream (4b3b) and further converted to 2 ternary bit (3b2t) streams.

The 2 ternary bit streams may represent 9 possible values where only 8 values may be needed to represent the 3-bit binary data. In this regard, the extra $9^{th}$ value in the ternary bits representation may be utilized in start and/or end of stream control codes and may also be utilized to indicate transmit error. The $9^{th}$ value in the ternary bit representation may also be utilized to resolve the ordering of the ternary symbol stream over a single twisted-pair wire connection.

For automotive applications, the above described Ethernet line code can allow the line rate to be slowed down in order to reduce EMI so that cheaper and lighter weight unshielded cabling can be used while still meeting automotive EMI requirements.

Figure 2:
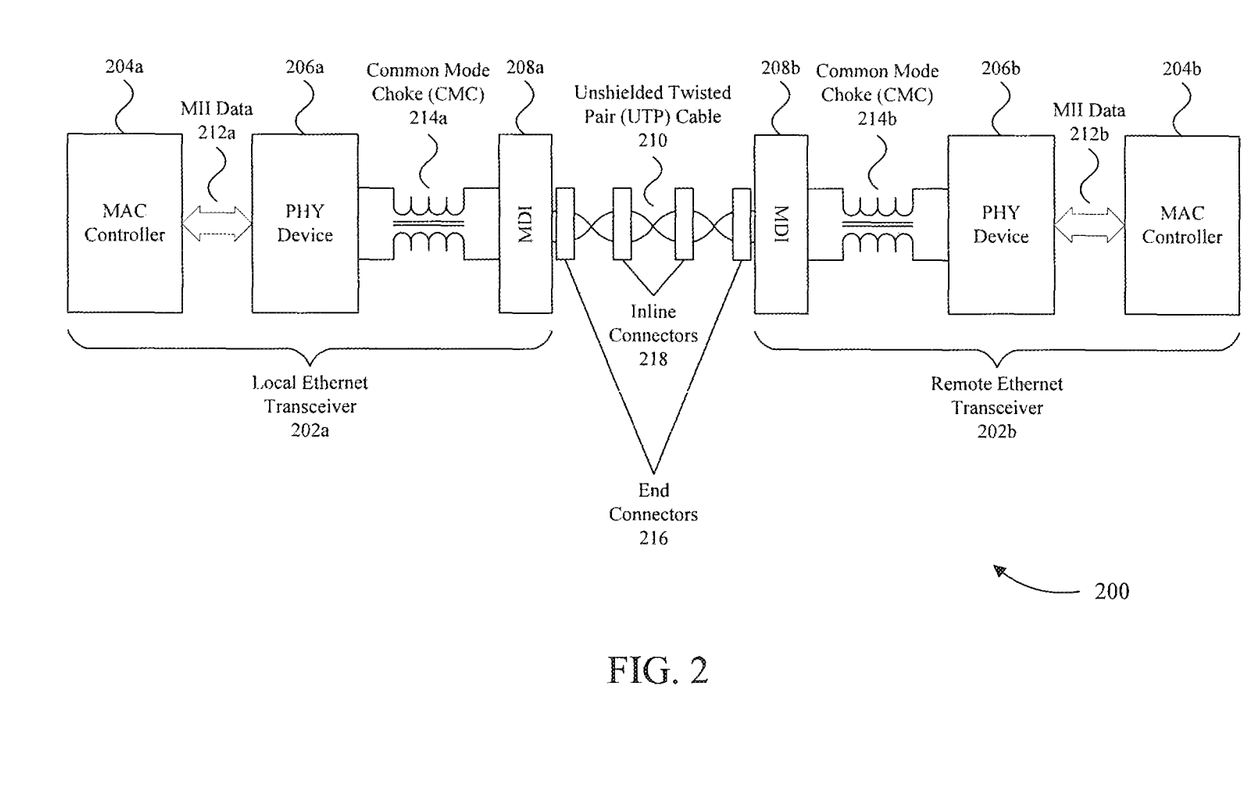
FIG. 2 illustrates an example block diagram of an Ethernet over unshielded twisted-pair (UTP) cabling link between a local Ethernet transceiver and a remote Ethernet transceiver in accordance with embodiments of the present disclosure.

FIG. 2 illustrates an example block diagram of an Ethernet over unshielded twisted-pair (UTP) cabling link 200 between a local Ethernet transceiver 202a and a remote Ethernet transceiver 202b in accordance with embodiments of the present disclosure. The two transceivers can be implemented within an automobile. The local Ethernet transceiver 202a comprises a medium access control (MAC) controller 204a, a physical layer (PHY) device 206a, and a medium dependent interface (MDI) 208a. The remote Ethernet transceiver 202b similarly comprises a MAC controller 204b, a PHY device 206b, and a MDI 208b.

The local Ethernet transceiver 202a and the remote Ethernet transceiver 202b communicate via a UTP cable 210. The UTP cable 210 comprises a single pair of unshielded copper wires, for example. Certain performance criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps Ethernet transmissions over twisted-pair cabling (1000BASE-T).

The data transmitted and received by the transceivers 202a and 202b can be formatted in accordance with the well-known Open Systems Interconnection (OSI) model. The OSI model partitions operability and functionality into seven distinct and hierarchical layers. Generally, each layer in the OSI model is structured so that it may provide a service to the immediately higher interfacing layer. For example, layer 1, or the PHY layer, can provide services to layer 2, or the data link layer, and layer 2 can provide services to layer 3, or the network layer. The data transmitted can comprise frames of Ethernet media independent interface (MII) data 212a and 212b, which can be delimited by start of stream and end of stream delimiters, for example. The data transmitted can also comprise IDLE codes that can be communicated between frames of data.

In the example Ethernet system shown in FIG. 2, the MAC controllers 204a and 204b represent layer 2 devices and the PHY devices 206a and 206b represent layer 1 devices. Devices not shown in FIG. 2, but coupled to MAC controllers 204a and 204b, represent one or more of the five highest layers. During transmission, each layer adds its own header to the data passed on from the interfacing layer above it. During reception, a compatible device having a similar OSI stack as the transmitting device strips off the headers as the message or packet passes from the lower layers up to the higher layers.

The MAC controllers 204a and 204b comprise suitable logic, circuitry, and/or code configured to provide the layer 2 requirements. The MAC controllers 204a and 204b can be configured as standard Ethernet MACs, such as those based on the IEEE 802.3 standard (e.g., the 100BASE-T IEEE 802.3 standard or the 1000BASE-T IEEE 802.3 standard).

The PHY devices 206a and 206b comprise suitable logic, circuitry, and/or code configured to provide layer 1 requirements, which include, but are not limited to packetization, data transfer, and serialization/deserialization. Data packets respectively received by the PHY devices 206a and 206b from MAC controllers 204a and 204b can include data and header information for each of the above six functional layers of the OSI model. The PHY devices 206a and 206b can be configured to encode data packets that are to be transmitted over the UTP cable 210 and/or to decode data packets received from the UTP cable 210.

Unlike the MAC controllers 204a and 204b, the PHY devices 206a and 206b may not be configured as standard Ethernet PHY devices based on the IEEE 802.3 standard. The changes to the PHY devices 206a and 206b may be made in order to meet cost, weight, and EMI demands of automotive in-vehicle networks. For example, where MAC controllers 204a and 204b are configured as standard 100Base-T Ethernet MACs or 1000Base-T Ethernet MACs, PHY devices 206a and 206b can be configured to respectively convert Ethernet MII data 212a and 212b, respectively produced by MAC controllers 204a and 204b, from 4-bit packet streams to 3-bit packet streams. The 3-bit packet streams can each be mapped to first and second ternary bits streams for communication to the other PHY device utilizing PAM-3 over the unshielded twisted-pair cable 210. The transmitting PHY device can multiplex the ternary bits streams into a single stream for transmission over the unshielded twisted-pair cable 210. For automotive applications, this Ethernet line code provided by the PHY devices 206a and 206b can allow the line rate to be slowed down as compared to standard PHY devices compliant with the IEEE 802.3 standard in order to reduce EMI so that cheaper, lightweight unshielded cabling, such as UTP cable 210, can be used while still meeting automotive EMI requirements. In addition, unlike standard Ethernet compliant PHYs, the PHY devices 206a and 206b can transmit and receive data over a single pair of cables instead of two or four pairs of cables used by 100BASE-T and 1000-BASE-T Ethernet transceivers.

It should be noted that common mode chokes (CMCs) 214a and 214b can be used to suppress common-mode noise and that UTP cable 210 can have, in addition to two end connectors 216, two or more inline connectors 218. It should be further noted that FIG. 2 provides only one example environment in which embodiments of the present disclosure can be implemented and is not meant to be limiting. The Ethernet system shown in FIG. 2 can be used, for example, to support communications within and between the different electronic domains in an automobile as shown in FIG. 1.

2. High resolution communication link diagnostics for in-vehicle Networks

Various tests are performed at the time of design and manufacture of in-vehicle networks to make sure the in-vehicle networks achieve designed for performances. After installation, or while the system is under operation, there is a chance an in-vehicle network could degrade or fail in some manner due to unexpected events and/or accidents. In order to provide early warning for system repair and help in locating any failure or degradation, system diagnostic capabilities are important for an in-vehicle network.

System diagnostics, like supply current, supply voltage, and/or temperature monitors, can be provided to help with detecting failures and degradation in both active and passive parts of the in-vehicle network. In addition, a comprehensive link diagnostic capability provides information on various failures and/or degradations of the passive part of the network, which includes data cables, connectors, and magnetics (e.g., CMCs).

The present disclosure provides an apparatus and method for measuring echo responses of communication links used in in-vehicle networks with high resolution and high dynamic range, allowing for diagnostics of various failures and/or degradations with high precision. Additional information can be provided to indicate signaling quality, insertion loss, and return loss of the communication links used in in-vehicle networks. Together, these measures and information can provide a comprehensive diagnostic capability that improves network reliability and safety of in-vehicle networks.

Figure 3:
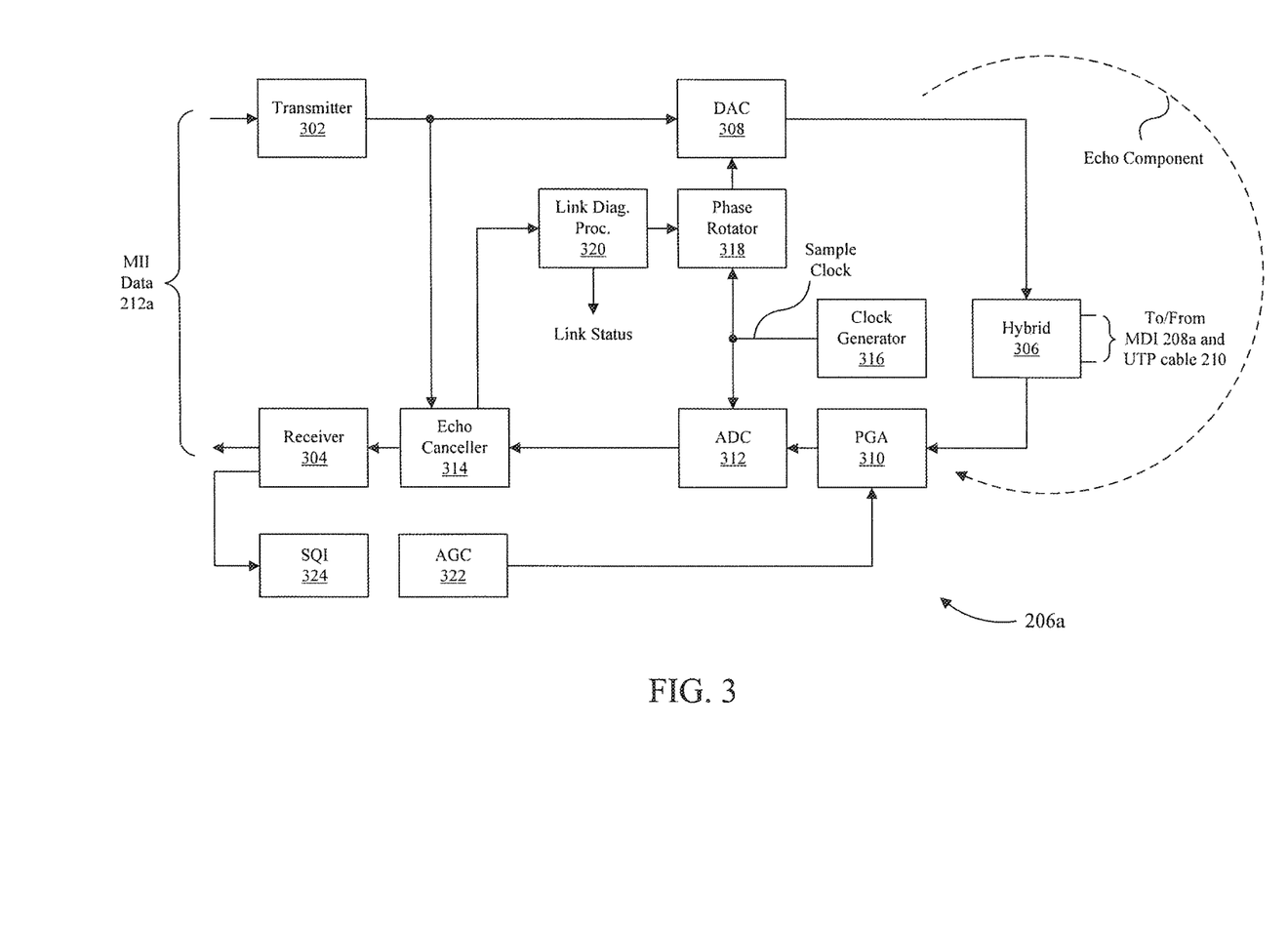
FIG. 3 illustrates an example block diagram of the PHY device in FIG. 2 in accordance with embodiments of the present disclosure.

FIG. 3 illustrates an example block diagram of the PHY device 206a in FIG. 2 in accordance with embodiments of the present disclosure. It should be noted that the implementation of the PHY device 206a in FIG. 3 is not limited to use within the Ethernet system in FIG. 2 and can be used in any appropriate Ethernet system as would be appreciated by one of ordinary skill in the art. The PHY device 206a is configured to measure high resolution echo responses received over the UTP cable 210 (and potentially other components) to perform a communication link diagnostic.

The PHY device 206a includes a transmitter 302 that receives MII data 212a from the MAC controller 204a in FIG. 2, and a receiver 304 that transmits MII data 212a to the MAC controller 204a. At the other ends of the transmitter 302 and the receiver 304, the transmitter 302 is coupled to a hybrid 306 through a digital-to-analog converter (DAC) 308 and the receiver 304 is coupled to the hybrid 306 through a programmable gain amplifier (PGA) 310, an analog-to-digital converter (ADC) 312, and an echo canceller 314. The hybrid 306 enables signals transmitted and received over the UTP cable 210 by the PHY device 206a to be separated to allow for full-duplex communication (i.e., simultaneous communications in both directions over the UTP cable 210).

The signals transmitted over the UTP cable 210 are generated by the transmitter 302 based on the MII data 212a (e.g., with an Ethernet line code as described above) and converted from the digital domain to the analog domain by the DAC 308. The signals received over the UTP cable 210, after undergoing amplification by the PGA 310, are converted from the analog domain to the digital domain by the ADC 312. The receiver 304 processes the digitized received signals after the digitized received signals have undergone echo cancellation by the echo canceller 314 to provide the MII data 212a. Other types of processing of the digitized received signals is possible but not shown in FIG. 3 for ease of description, including cross talk cancellation and equalization.

Because the hybrid 306 is not perfect and/or for other reasons, an echo component from a transmit signal transmitted by the transmitter 302 can be received by the receiver 304 over the UTP cable 210 as shown in FIG. 3. The echo canceller 314 is configured to compensate for such an echo component. In general, the echo cancellation performed by the echo canceller 314 involves recognizing the original transmit signal that appears, with some delay and with some magnitude, in the receive signal. Once this echo component is recognized, the echo component can be removed by effectively subtracting it from the received signal.

In one embodiment, the echo canceller 314 includes an adaptive digital filter and a subtractor (neither of which are shown in FIG. 3). The adaptive digital filter is configured to estimate the impulse response of the channel over which the echo component is received, form a set of coefficients for the adaptive digital filter based on the estimate, and then generate a replica of the echo component using the adaptive filter. The subtractor is subsequently configured to subtract the generated replica of the echo component from the received signal. The impulse response of the channel over which the echo is received is specifically estimated by the adaptive digital filter based on data or training signals transmitted by the transmitter 302 over the UTP cable 210.

Because data can be used to estimate the impulse response (as opposed to training signals), the impact on the Ethernet systems throughput can be reduced. The echo of the data or training signals is gathered by the echo canceller 314 as a series of time-domain samples produced by the ADC 312. The impulse response and filter coefficients are then formed based on these samples. The channel over which the echo component is received includes, for example, the following physical components: UTP cable 210, the end connectors 216, any inline connectors 218, and any magnetics such as CMC 214*a*.

To generate a higher resolution estimate of the impulse response of the echo channel, the phase of the sample clock used by the DAC 308 can be rotated relative to the phase of the sample clock used by the ADC 312. The DAC 308 generates analog samples of the data or training signals (which are transmitted over the UTP cable 210 and used by the echo canceller 314 to estimate the impulse response of the echo channel) based on the sample clock provided by a clock generator 316 (e.g., a phase locked loop and/or crystal oscillator). The ADC 312 uses the sample clock to sample the echo of the data or training signals, which are received over the UTP cable 210 and used by the echo canceller 314 to estimate the impulse response of the echo channel.

A phase rotator 318 can rotate the phase of the sample clock used by the DAC 308 relative to the phase of the sample clock used by the ADC 312. More specifically, after the echo canceller 314 collects enough samples of the data or training signals received over the UTP cable 210 to generate one estimate of the impulse response of the channel over which the echo component is received, the phase of the sample clock used by the DAC 308 can be rotated by a fraction of the clock period of the sample clock. The DAC 308 can then generate another set of analog samples of the data or training signals based on the sample clock provided by the clock generator 316 and transmit those samples over the UTP cable 210. The ADC 312 can then use the sample clock to sample the echo of the data or training signals received over the UTP cable 210 and pass the samples along to the echo canceller 314 to generate another estimate of the impulse response of the echo channel at the new phase alignment. In general, the new phase alignment allows the echo canceller 314 to obtain samples of the impulse response at different points in time than with the previous phase alignment. The different points in time correspond to points in time between the samples of the previous impulse response.

The phase rotator 318 can continue to rotate the phase of the sample clock by the fraction of the clock period to allow the echo canceller 314 to obtain additional estimates of the impulse response. After a sufficient or predetermined number of impulse responses have been estimated, the echo canceller 314 (or the link diagnostic processor 320 described below) can combine the different impulse responses by appropriately interleaving the respective samples, or data points, of the different impulse responses. The combined impulse response has a comparatively higher resolution than any of the individual impulse responses. For example, if the phase of the sample clock is rotated 16 times by $1/16$ of the clock period of the sample clock, the combined impulse response should have 16 times the resolution of any individual impulse response estimated at one of the 16 different phase rotations of the clock period.

In the embodiment of FIG. 3, the DAC 308 and the ADC 312 use the same sample clock generated by the clock generator 316. However, it should be noted that in other embodiments the DAC 308 and the ADC 312 can use separately generated sample clocks which are further synchronized.

A link diagnostic processor 320, comprising suitable logic, circuitry, and/or code, can be used to control the phase rotator 318 to rotate the phase of the sample clock produced by the clock generate 316 as discussed above. The link diagnostic processor 320 can also be used to process the high resolution impulse response generated by the echo canceller 314 (or, alternatively, by the link diagnostic processor 320) to perform a diagnostic of the communication link, which includes the UTP cable 210, the end connectors 216, any inline connectors 218, and any magnetics such as CMC 214*a*. For example, the link diagnostic processor 320 can process the high resolution impulse response to determine: (1) whether the UTP cable 210 is disconnected at the local side of the link; (2) whether the UTP cable 210 is disconnected at the remote side of the link; (3) whether the UTP cable 210 is shorted at any section of the link and the location of the short; (4) whether one wire of the UTP cable 210 is shorted to ground or the supply voltage; (5) whether the UTP cable 210 is disconnected at any of the in-line connectors 218 (assuming such in-line connectors are used); (6) whether any connectors, such as the end connectors 216 or the in-line connectors 218 have deteriorated to some degree; and (7) the length of a link segment of the UTP cable 210.

The link diagnostic processor 320 can store the impulse response of the channel over which the echo is received under normal operation, without any fault or deterioration, and compare this stored impulse response to the estimated, high resolution impulse response to detect a fault or deterioration condition. The link diagnostic processor 320 can further compare the estimated, high resolution impulse response received from the echo canceller 314 with conditions that are characteristic to the above mentioned faults or degradations to determine whether a specific fault or degradation exists. After analyzing the estimated, high-resolution impulse response, the link diagnostic processor 320 can output the current condition of the link, which can be used to provide a driver or automotive technician with information regarding a specific fault or degradation condition within the in-vehicle network if one is found to exist or an early warning of a potential fault condition.

In addition to the above described functionality, the link diagnostic processor 320 can be further configured to low-pass filter the estimated, high-resolution impulse response to reject out-of-band noise. To this end, the link diagnostic processor 320 can include a low-pass filter. Rejecting out-of-band noise can improve dynamic range and allow for greater detection of faults or degradations in the communication link.

In another embodiment, the link diagnostic processor that actually processes the high resolution impulse response to perform a diagnostic of the communication link can be located at the remote Ethernet transceiver 202*b* shown in FIG. 2. For example, once the high resolution impulse response is generated by the link diagnostic processor 320 at the PHY device 206*a*, the high resolution impulse response can be transmitted by the PHY device 206*a* over the UTP cable 210 to the remote Ethernet transceiver 202*b*. A link diagnostic processor at the remote Ethernet transceiver 202*b* can then process the high resolution impulse response, as described above, to perform a diagnostic of the communication link.

The PGA 310 and an Automatic Gain Controller (AGC) 322 can be used to keep the received echo components within the linear dynamic range of the ADC 312. More specifically, the AGC 322 can determine an appropriate gain setting for the PGA 210 to apply to the signal received over the UTP cable 210 to keep the signal (and any echo component it may have) within the linear dynamic range of the ADC 312. The gain setting can be correlated to an estimated insertion loss of the UTP cable 210 to provide an insertion loss indicator (ILI) parameter for the communication link generated by the echo canceller 314. In addition, the echo canceller 314 can process the estimated impulse response of the echo channel to provide a return loss indicator (RLI) of the communication link's return loss. In addition, a Signal Quality Indicator (SQI) 324 can be used to provide an SCSI parameter indicative of the quality of any signal recovered by the receiver 304 over the communication link. The ILI, RLI, and SQI parameters can each be used to provide further communication link diagnostic capabilities. For example, each of the parameters can be compared to a respective nominal value for the parameter to detect a fault condition in the communication link.

In yet another embodiment, the data or training signals transmitted over UTP cable 210 by PHY 206a can be transmitted in either a differential mode or a common mode. The data or training signals can specifically be transmitted over UTP cable 210 by PHY 206a in a common mode to provide more information to provide further communication link diagnostic capabilities. For UTP cables, such as UTP cable 210, it is possible to measure differential mode to common mode conversion of the cable for its EMC performance. Where UTP cable 210 is substituted for an STP cable, it is possible to detect and locate faults in the shield of the STP cable using common mode transmit and receive capability. The cable shield is connected to a common mode reference and then high resolution echo analysis (such as that described above) can be used to provide fault (e.g., chafing) location of the shielded cables.

Figure 4:
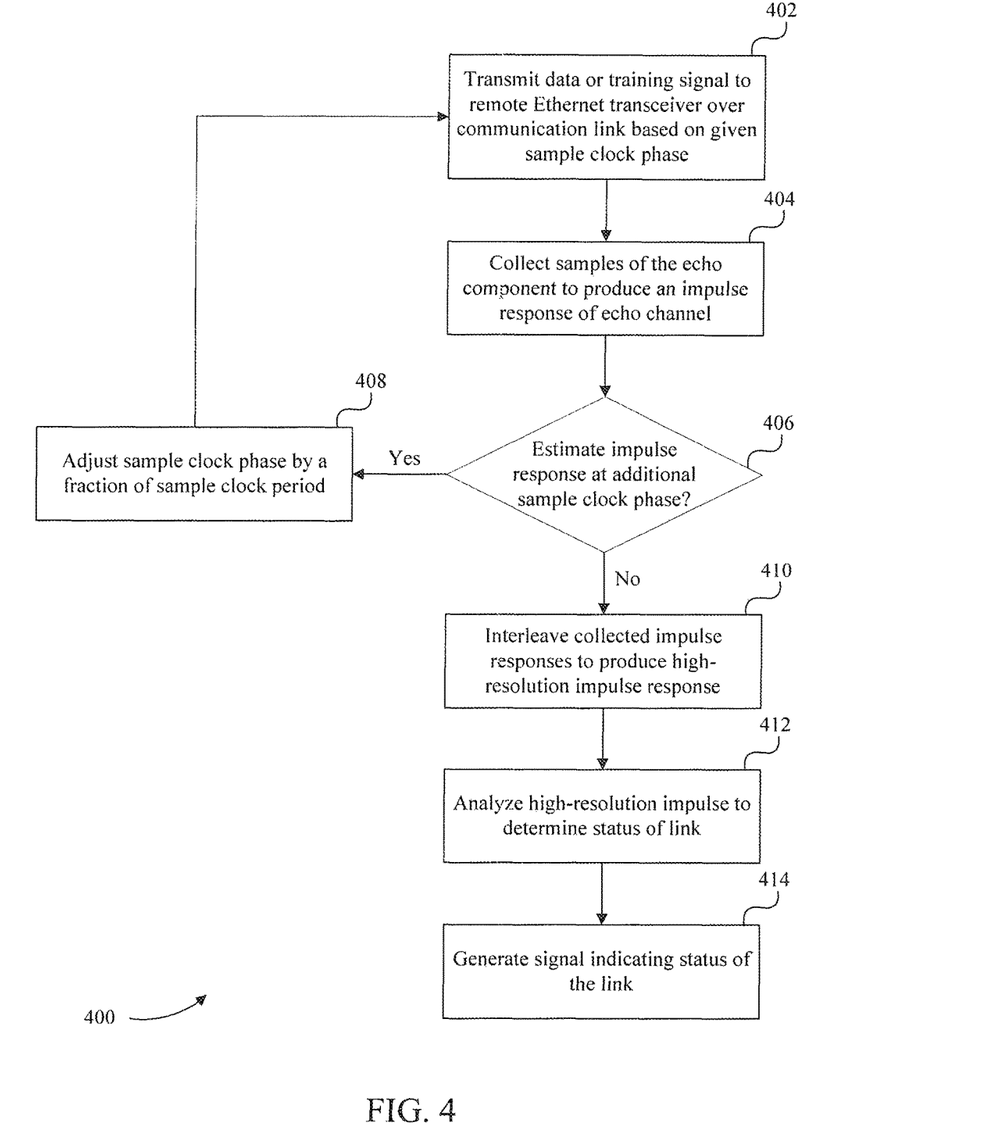
FIG. 4 illustrates a flowchart of method for performing a communication link diagnostic in an in-vehicle network in accordance with embodiments of the present disclosure.

Referring now to FIG. 4, a flowchart 400 of method for performing a communication link diagnostic in an in-vehicle network is illustrated in accordance with embodiments of the present disclosure. The method of flowchart 400 can be performed, for example, by the PHY device 206a in FIG. 3. However, the method of flowchart 400 is not limited to being performed by the PHY device 206a in FIG. 3 and can be performed by other, appropriate PHY devices as would be appreciated by one of ordinary skill in the art.

The method of flowchart 400 starts at step 402. At step 402, data or training signals are sent by a PHY device of a local Ethernet transceiver over a communication link to a remote Ethernet transceiver. Analog samples of the data or training signals that are transmitted over the communication link are produced by a DAC at a rate determined based on a sample clock. The communication link includes the cable (e.g., a single pair UTP cable), end connectors, any in-line connectors, and any magnetics such as CMCs.

After the data or training signals are sent at step 402, the method of flowchart 400 proceeds to step 404. At step 404, the PHY device of the local Ethernet transceiver collects samples of the echo component of the transmitted data or training signals received over the communication link. The samples are obtained using an ADC at a rate determined based on the sample clock, which may or may not be the same sample clock used by the DAC at step 402. After the samples are obtained, the samples are used to produce an estimated impulse response of the channel over which the echo component is received.

After the estimated impulse response is produced at step 404, the method of flowchart 400 proceeds to step 406. At step 406, a determination is made as to whether an additional impulse response is to be estimated for the channel over which the echo component is received. If the determination at step 406 is yes the method of flowchart 400 proceeds to step 408. If the determination at step 406 is no, the method of flowchart proceeds to step 410. The determination as step 406 can be made based on a fixed number of desired impulse response estimations or some other criteria.

Assuming the determination at step 406 is yes, the method of flowchart 400 proceeds to step 408. At step 408, the phase of the sample clock used by the DAC to produce the data or training signal samples at step 402 is rotated relative to the phase of the sample clock used by the ADC to collect samples of the echo component at step 404. The phase of the sample clock can be rotated by a fraction of the sample clock period, and the method of flowchart 400 proceeds back to step 402.

If, on the other hand, the determination at step 406 is no, the method of flowchart 400 proceeds to step 410. At step 410, all of the estimated impulse responses are combined by appropriately interleaving the respective samples or data points of the different impulse responses. The combined impulse response has a comparatively higher resolution than any of the individual impulse responses.

After step 410, the method of flowchart proceeds to step 412. At step 412, the high resolution impulse response generated at step 410 can be analyzed. For example, the high resolution impulse response can be analyzed to determine: (1) whether the UTP cable is disconnected at the local side of the link; (2) whether the UTP cable is disconnected at the remote side of the link; (3) whether the UTP cable is shorted at any section of the link and the location of the short; (4) whether one wire of the UTP cable is shorted to ground or the supply voltage; (5) whether the UTP cable is disconnected at any in-line connector (assuming such in-line connectors are used); (6) whether any connectors, such as end connectors or in-line connectors have deteriorated to some degree; and (7) the length of a link segment of the UTP cable.

At step 412, a stored impulse response of the channel over which the echo component is received under normal operation, without any fault or deterioration, can be compared to the estimated, high resolution impulse response to detect a fault or deterioration condition. At step 412, the estimated, high resolution impulse response can be compared to conditions that are characteristic to the above mentioned faults or degradations to determine whether a specific fault or degradation exists.

After analyzing the estimated, high-resolution impulse response at step 412, the method of flowchart 400 proceeds to step 414. At step 414, a signal indicating the current condition of the link can be generated and output. The signal can be used to provide a driver or automotive technician with information regarding a specific fault or degradation condition within the in-vehicle network if one is found to exist or an early warning of a potential fault condition.

3. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
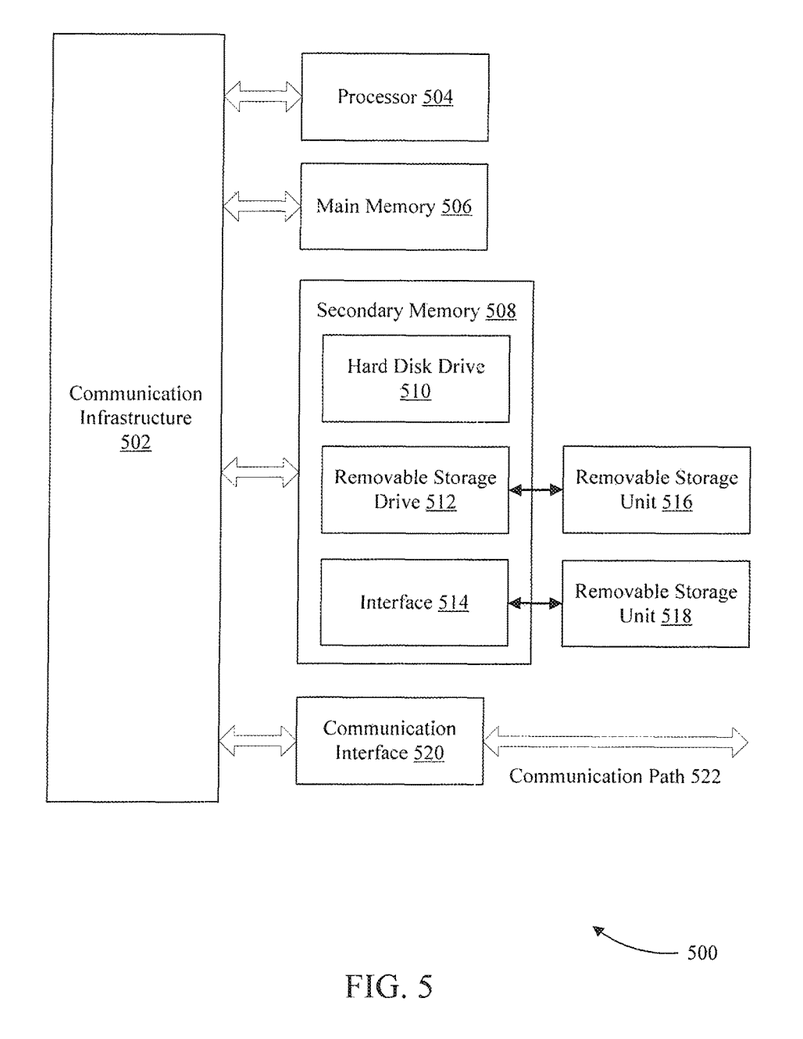
FIG. 5 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. Blocks depicted in FIGS. 2 and 3 may execute on one or more computer systems 500 to perform the functionality described herein. Furthermore, each of the steps of the method depicted in FIG. 4 can be implemented on one or more computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

4. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A local Ethernet transceiver in an in-vehicle network, comprising:
 a media access control (MAC) controller;
 a physical layer (PHY) device comprising:
  a transmitter configured to convert media independent interface (MII) data, received from the MAC controller, from a 4-bit packet stream to one or more first ternary bit streams;
  a digital-to-analog converter (DAC) configured to form an analog signal of the one or more first ternary bit streams, at a rate determined based on a first clock, for transmission to a remote Ethernet transceiver via a communication link comprising a single pair of cables;
  an analog-to-digital converter (ADC) configured to generate samples, at a rate determined based on a second clock, of a first echo component of the one or more first ternary bit streams received over the communication link;

an echo canceller configured to form a first impulse response based on the samples of the first echo component; and a link diagnostic processor configured to perform a diagnostic of the communication link based on the first impulse response, wherein the DAC is further configured to form an analog signal of one or more second ternary bit streams, at a rate determined based on the first clock after a phase of the first clock has been rotated by a phase rotator for transmission to the remote Ethernet transceiver via the communication link, wherein the echo canceller is further configured to form a second impulse response of a second echo component of the one or more second ternary bit streams received over the communication link, and wherein the link diagnostic processor is further configured to perform the diagnostic of the communication link based on a high resolution impulse response formed by combining the first impulse response and the second impulse response.

2. The local Ethernet transceiver of claim 1, wherein the link diagnostic processor is further configured to control the phase rotator to rotate the phase of the first clock relative to a phase of the second clock by a fraction of a clock period between the transmission of the analog signal of the one or more first ternary bit streams and the transmission of the analog signal of the one or more second ternary bit streams.

3. The local Ethernet transceiver of 1, wherein the link diagnostic processor is configured to perform the diagnostic of the communication link by comparing the high resolution impulse response formed by combining the first impulse response and the second impulse response to a stored impulse response.

4. The local Ethernet transceiver of claim 3, wherein the stored impulse response is formed in a same manner as the high resolution impulse response.

5. The local Ethernet transceiver of claim 3, wherein the link diagnostic processor is configured to perform the diagnostic of the communication link to provide an early warning of a potential failure.

6. The local Ethernet transceiver of claim 5, wherein the link diagnostic processor is further configured to use an insertion loss parameter for the communication link, a return loss parameter of the communication link, or a signal quality parameter of the communication link to provide the early warning of the potential failure.

7. The local Ethernet transceiver of claim 1, wherein the link diagnostic processor is configured to perform the diagnostic of the communication link to detect whether the single pair of cables is disconnected at the local Ethernet transceiver or whether the single pair of cables is disconnected at the remote Ethernet transceiver.

8. The local Ethernet transceiver of claim 1, wherein the link diagnostic processor is configured to perform the diagnostic of the communication link to detect whether one cable of the single pair of cables is shorted to ground or a supply voltage.

9. The local Ethernet transceiver of claim 1, wherein the link diagnostic processor is configured to perform the diagnostic of the communication link to detect whether the single pair of cables is disconnected at an in-line connector.

10. The local Ethernet transceiver of claim 1, wherein the single pair of cables is an unshielded twisted pair cable.

11. The local Ethernet transceiver of claim 1, wherein the analog signal of the one or more first ternary bit streams is transmitted in common mode to the remote Ethernet transceiver via the communication link.

12. The local Ethernet transceiver of claim 1, wherein the analog signal of the one or more first ternary bit streams is a data signal or a training signal.

13. A method comprising:
converting media independent interface (MII) data from a 4-bit packet stream to one or more first ternary bit streams;

forming an analog signal of the one or more first ternary bit streams, at a rate determined based on a first clock, for transmission to a remote Ethernet transceiver via a communication link comprising a single pair of cables;

generating samples, at a rate determined based on a second clock, of a first echo component of the one or more first ternary bit streams received over the communication link;

forming a first impulse response based on the samples of the first echo component;

forming an analog signal of one or more second ternary bit streams, at a rate determined based on the first clock after a phase of the first clock has been rotated, for transmission to the remote Ethernet transceiver via the communication link;

forming a second impulse response of a second echo component of the one or more second ternary bit streams received over the communication link; and performing a diagnostic of the communication link based on the first impulse response and the second impulse response, wherein the diagnostic of the communication link is performed based on a high resolution impulse response formed by combining the first impulse response and the second impulse response.

14. A physical layer (PHY) device comprising:
a transmitter configured to convert media independent interface (MII) data from a 4-bit packet stream to one or more first ternary bit streams;

a digital-to-analog converter (DAC) configured to:
form an analog signal of the one or more first ternary bit streams, at a rate determined based on a first clock, for a first transmission to a remote Ethernet transceiver via a communication link comprising a single pair of cables, and form an analog signal of one or more second ternary bit streams, at a rate determined based on the first clock after a phase of the first clock has been rotated by a phase rotator for a second transmission to the remote Ethernet transceiver via the communication link;

an analog-to-digital converter (ADC) configured to:
generate samples, at a rate determined based on a second clock, of a first echo component of the one or more first ternary bit streams received over the communication link, and generate samples of a second impulse response of a second echo component of the one or more second ternary bit streams received over the communication link;

an echo canceller configured to form a first impulse response based on the samples of the first echo component and a second impulse response based samples of the second echo component; and a link diagnostic processor configured to perform a diagnostic of the communication link based on a high resolution impulse response formed by combining the first impulse response and the second impulse response.

15. The PHY device of claim 14, wherein the link diagnostic processor is further configured to control the phase rotator to rotate the phase of the first clock relative to a phase of the second clock by a fraction of a clock period.

16. The PHY device of claim 14, wherein the link diagnostic processor is configured to perform the diagnostic of the communication link by comparing the high resolution impulse response formed by combining the first impulse response and the second impulse response to a stored impulse response.

17. The PHY device of claim 16, wherein the stored impulse response is formed in a same manner as the high resolution impulse response.

18. The PHY device of claim 14, wherein the link diagnostic processor is configured to perform the diagnostic of the communication link to provide an early warning of a potential failure.

19. The PHY device of claim 18, wherein the link diagnostic processor is further configured to use an insertion loss parameter for the communication link, a return loss parameter of the communication link, or a signal quality parameter of the communication link to provide the early warning of the potential failure.

20. The PHY device of claim 14, wherein the link diagnostic processor is configured to perform the diagnostic of the communication link to detect whether the communication link is disconnected at the PHY device or whether the communication link is disconnected at a remote PHY device.

* * * * *